(12) United States Patent
Dimmick et al.

(10) Patent No.: US 7,430,348 B2
(45) Date of Patent: Sep. 30, 2008

(54) FOUR-PORT OPTICAL FILTER FABRICATED FROM TAPERED OPTICAL FIBER

(75) Inventors: Timothy Eugene Dimmick, Oviedo, FL (US); Kevin Randolph Harper, Palm Bay, FL (US); Douglas James Markos, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 10 days.

(21) Appl. No.: 11/538,957

(22) Filed: Oct. 5, 2006

(65) Prior Publication Data

US 2007/0154139 A1 Jul. 5, 2007

Related U.S. Application Data

(63) Continuation of application No. 11/226,833, filed on Sep. 14, 2005, now Pat. No. 7,177,503.

(51) Int. Cl.
*G02B 6/26* (2006.01)
*H01S 3/08* (2006.01)

(52) U.S. Cl. .............................. 385/30; 385/32; 372/94
(58) Field of Classification Search .................. 385/30, 385/43, 32; 372/94
See application file for complete search history.

(56) References Cited

U.S. PATENT DOCUMENTS

| 5,138,676 | A | 8/1992 | Stowe et al. |
| 5,452,393 | A | 9/1995 | Stowe et al. |
| 5,742,633 | A | 4/1998 | Stone et al. |
| 6,580,851 | B1 | 6/2003 | Vahala et al. |
| 6,865,317 | B2 | 3/2005 | Vahala et al. |

OTHER PUBLICATIONS

"Ultralow Loss, High Q, Four Port Resonant Couplers For Quantum Optics And Photonics" H. Rokhsari; and K.J. Vahala, Physical Review Letters vol. 92, pp. 253905-1-253905-4 (Jun. 2004).
"Fiber-Optic Add-Drop Device Based On A Silica Microsphere—Whispering Gallery Mode System" M. Gai; G. Hunziker; and K. Vahala, IEEE Photonics Technology Letters, vol. 11, pp. 686-687 (Jun. 1999).
"Optical Fiber Microcoil Resonator", M. Sumetsky, Optics Express, vol. 12, pp. 2303-2316 (May 2004).
"Fabrication And Study Of Bent And Coiled Free Silica Nanowires: Self-Coupling Microloop Optical Interferometer", M. Sumetsky; Y. Dulashko; and A. Hale, Optics Express, vol. 12, pp. 3521-3531 (Jul. 2004).
"Fused Taper Fibre Microcoupler", G. Kakarantzas, T.E. Dimmick; T.A. Birks; and P. St. J. Russell, Optoelectronics Group, Dept. of Physics, Univ. of Bath, Bath BA2 7AY, U.K. Proc. OFC 2000, TuB6-1, pp. 35-37 (2000).
"Microring Resonator Channel Dropping Filters", B.E. Little; S.T. Chu; H.A. Haus; J. Foresi; and J.P. Laine, Journal of Lightwave Technology, vol. 15 pp. 998-1005 (Jun. 1997).

*Primary Examiner*—Kevin S Wood
*Assistant Examiner*—Jerry T Rahll
(74) *Attorney, Agent, or Firm*—GrayRobinson, PA

(57) ABSTRACT

A four-port optical filter is provided including two tapered optical fibers, each having a loop in the area of their tapered portions, which are located relative to one another to form a ring resonator. The optical filter has a low Q with a broadband filter response which is useful as a channel interleaver or de-interleaver for dense wavelength division multiplexing and other applications.

13 Claims, 4 Drawing Sheets

FOUR-PORT OPTICAL FILTER FABRICATED FROM TAPERED OPTICAL FIBER

FIELD OF THE INVENTION

This invention is directed to a four-port optical filter, and, more particularly, to an optical filter which employs two tapered optical fibers, each having a loop, which collectively form a ring resonator. The filter is particularly useful in applications requiring a low Q, broadband filter response such as channel interleavers or de-interleavers for dense wavelength division multiplexing.

BACKGROUND OF THE INVENTION

Fiber-optic communications systems employ techniques known as wavelength division multiplexing (WDM) and dense wavelength division multiplexing (DWDM) to transit large volumes of information at high data rates over a single optical fiber. Many optical wavelengths of light or "optical channels" are employed in both WDM and DWDM systems, with each optical channel individually transmitting a substantial amount of data. The optical power of one optical channel co-propagates with a number of the other optical channels within a single optical fiber.

It is often necessary to remove or add an optical channel to an optical fiber depending on routing requirements of the communications systems and for other reasons. This function is accomplished by a filter, typically referred to as a drop/add filter or an interleaver/de-interleaver. There are different types of drop/add filters disclosed in the prior art, but the general principal of operation involves the introduction of a wavelength division multiplexed or dense wavelength division multiplexed signal into the input port of the filter. The signal includes a number of different optical channels, as noted above. In performing the "drop" function, the filter is operative to remove at least one of the optical channels from the signal and transfer it to a drop port while allowing the remainder of the signal to pass through the filter to an output port. The "add" function of the filter is realized by introducing a signal with one or more optical channels into the filter through an add port where it is combined within the filter with another signal from the input port. The combined signal is then transmitted to the output port.

One type of optical filtering device currently in use is an in-fiber Bragg grating placed in series with an optical circulator. A wavelength division multiplexed signal or dense wavelength division multiplexed signal is input to the circulator and the Bragg grating is effective to allow certain optical channels of the signal to pass through while one or more others are reflected back to the circulator and output through a drop port. These types of filtering systems have excellent spectral performance, but are large and have significant throughput loss.

Another type of filtering system is shown, for example, in U.S. Pat. No. 6,580,851 to Vahala et al which describes a four-port optical filter employing one or more tapered optical fibers coupled to a spherical resonator. A wavelength division multiplexed signal is input through one optical fiber to the spherical resonator by evanescent field coupling. The resonator is effective to drop one or more optical channels from the signal, or add an optical channel, which is then output from the resonator to the same optical fiber or a second optical fiber. Filtering systems of this type require precise alignment between the resonator and tapered optical fiber(s), and spherical resonators are difficult to manufacture. Additionally, this system has a high optical Q. The term "optical Q" refers to the quality factor of the resonator in the system, and high Q resonators exhibit a much narrower filter response as compared to low Q resonators. A broadband filter response is preferable in channel interleavers and de-interleavers for dense wavelength division multiplexing.

SUMMARY OF THE INVENTION

This invention is directed to a four-port optical filter comprising two tapered optical fibers, each having a loop, which are located relative to one another to form a ring resonator. The filter has a low Q with a broadband filter response which is useful as a channel interleaver or de-interleaver for dense wavelength division multiplexing, and other applications.

In one presently preferred embodiment, the tapered portion of each of two tapered optical fibers is wrapped around a cylindrical rod to form a first loop in a first optical fiber and a second loop in the second optical fiber. These loops are located relative to one another along the rod to form a ring resonator. The resonator is capable of interleaving or adding one or more optical channels to an input signal, and dropping or de-interleaving one or more optical channels from such signal, while outputting other optical channels.

One important advantage of the filter of this invention is that the ring resonator is formed by the optical fibers themselves, thus eliminating the difficulties of coupling tapered optical fibers to discrete spherical or other types of resonators such as taught in the prior art discussed above. Additionally, tapered optical fibers are easily integrated with conventional single mode fiber because essentially zero loss transitions may be made between the two at essentially any tapered fiber diameter. Further, evanescent field coupling may be employed with tapered optical fibers since the light propagating through the optical fiber is guided by the boundary between the taper in the optical fiber and the external environment.

BRIEF DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
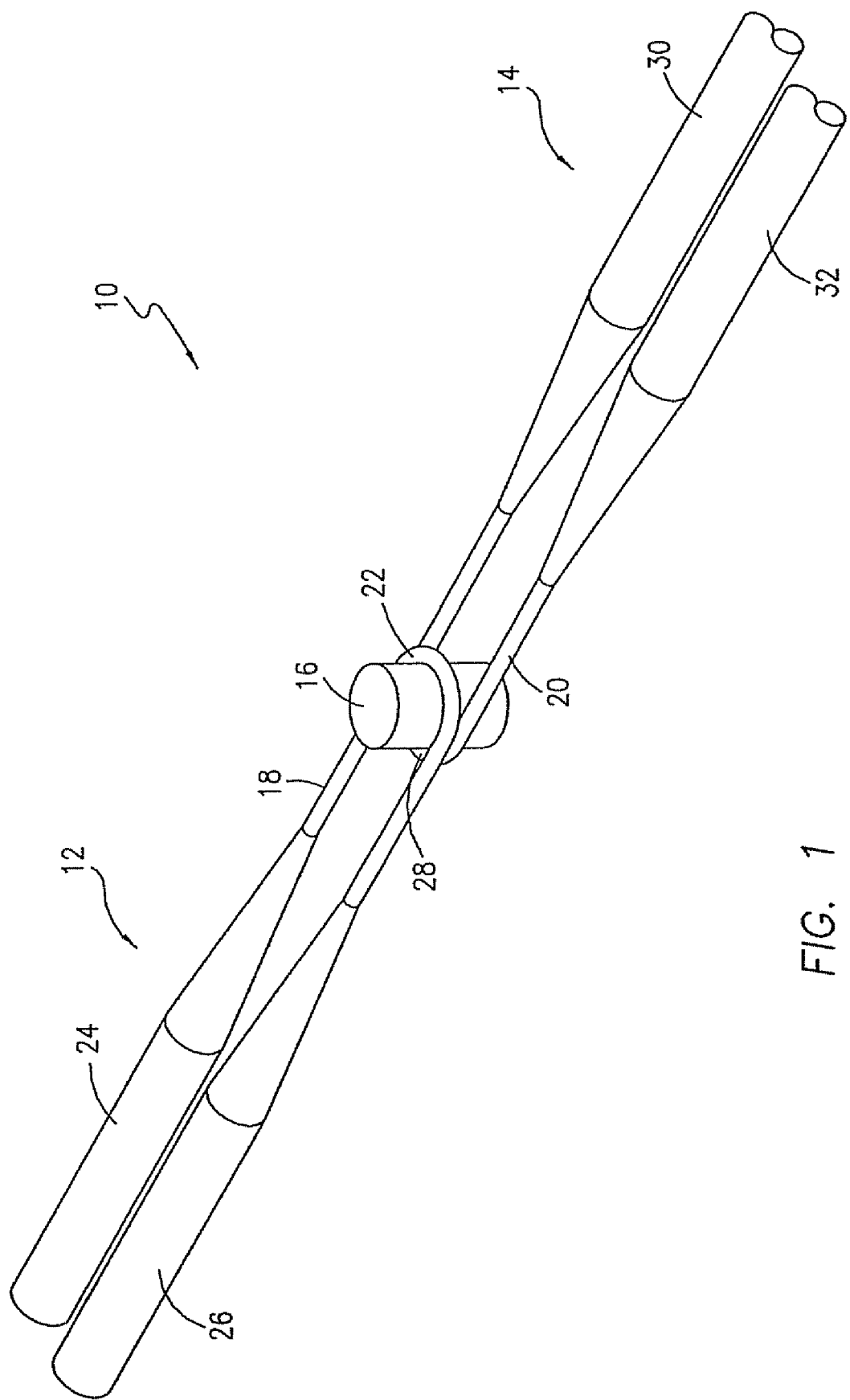
FIG. 1 is a perspective view of the filter of this invention.
Figure 2:
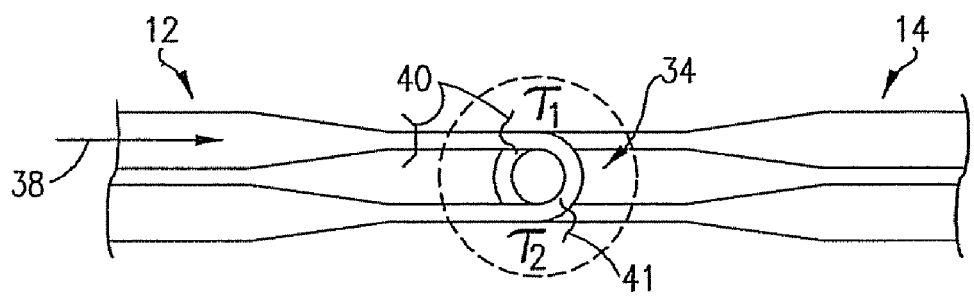
FIG. 2 is a plan view of the filter depicted in FIG. 1.
Figure 3:
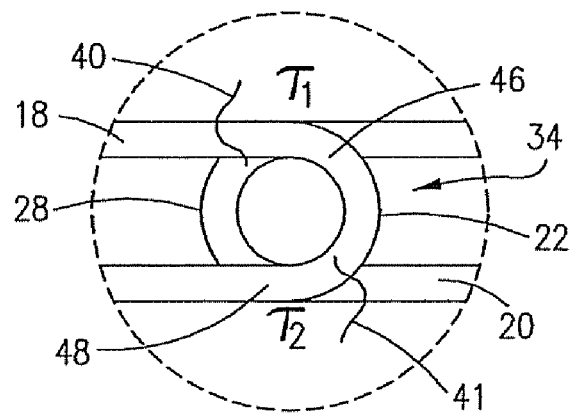
FIG. 3 is an enlarged view of the encircled portion of FIG. 2.
Figure 4:
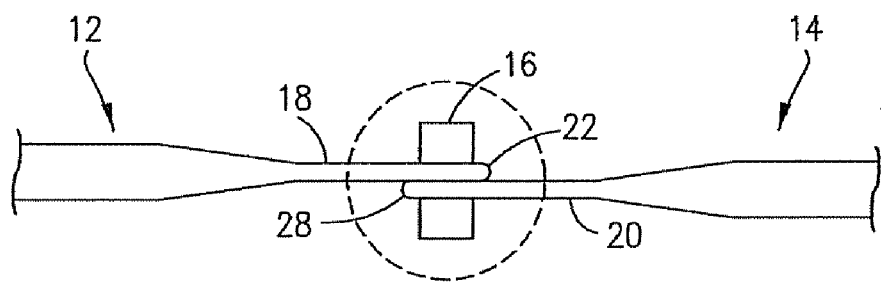
FIG. 4 is a side elevational view of the filter illustrated in FIG. 1.
Figure 5:
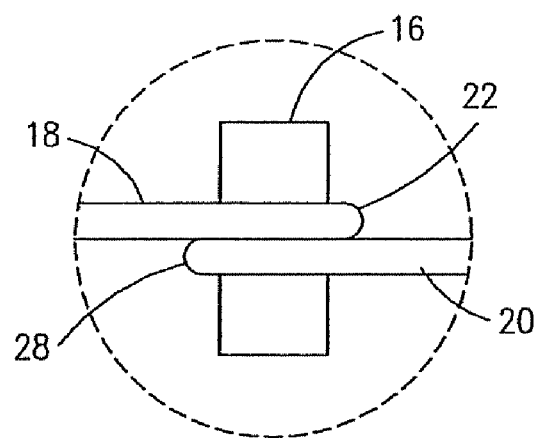
FIG. 5 is an enlarged view of the encircled portion of FIG. 4.

Referring now to the Figures, the four-port optical filter 10 of this invention comprises a first tapered optical fiber 12, a second tapered optical fiber 14, and, in one embodiment, a cylindrical rod 16. Each of the optical fibers 12 and 14 is formed of silica, and at least a portion of the rod 16 is formed of a material having an index of refraction below that of the optical fibers 12, 14 so that coupling between the optical fibers 12, 14 and rod 16 is suppressed, for purposes to become apparent below. The optical fibers 12 and 14 are characterized as being "tapered" because they were drawn while heated by a flame to form a portion along their length having a reduced, uniform waist diameter. For purposes of the present discussion, the "tapered portion" 18 of optical fiber 12 is considered to be the area of uniform waist diameter along its length as best seen in FIG. 1, and the tapered portion 20 is the same area along the optical fiber 14.

Referring specifically to FIGS. 1-5, the tapered portion 18 of the first optical fiber 12 is wrapped around the rod 16 to form a first loop 22 along the rod 16. The optical fiber 12 is folded back on itself so that its opposed ends are generally parallel to one another. One of these ends forms the input port 24 of the filter 10, and the opposite end forms the drop port 26, as discussed in more detail below. Similarly, the tapered portion 20 of the second optical fiber 14 is wrapped around the rod 16, from the opposite direction to that of the first optical fiber 14, to form a second loop 28 along the rod 16. The optical fiber 14 is folded back on itself in the same manner as optical fiber 12, and its opposite ends form the thru port 30 of the filter 10 and the add port 32. The term "loop" refers to that part of the tapered portion 18 and 20 of respective optical fibers 12 and 14 which extends around the rod 16. Each of the first and second loops 22 and 28 extend approximately 180° around the rod 16, from opposite directions, and therefore collectively form a ring which functions as a ring resonator 34 in the filter 10 of this invention.

In one presently preferred embodiment of this invention, each of the optical fibers 12 and 14 are held in tension at their respective, opposed ends to maintain the position of loops 22 and 28 relative to the rod 16. Such tensioning means (not shown) is therefore applied to both the input port 24 and drop port 26 of first optical fiber 12, and to the thru port 30 and add port 32 of the second optical fiber 14. Alternatively, the first and second optical fibers 12, 14 may be annealed in the area of loops 22 and 28 so that they permanently assume the radius of curvature of the rod 16 and need not be held in tension. In that instance, other means (not shown) are provided to maintain the loops 22 and 28 in position along the rod 16. Regardless of whether the loops 22 and 28 are held in tension or annealed, they are maintained in close proximity to one another along the rod 16. See FIGS. 1, 4 and 5.

Figures 8, 9:
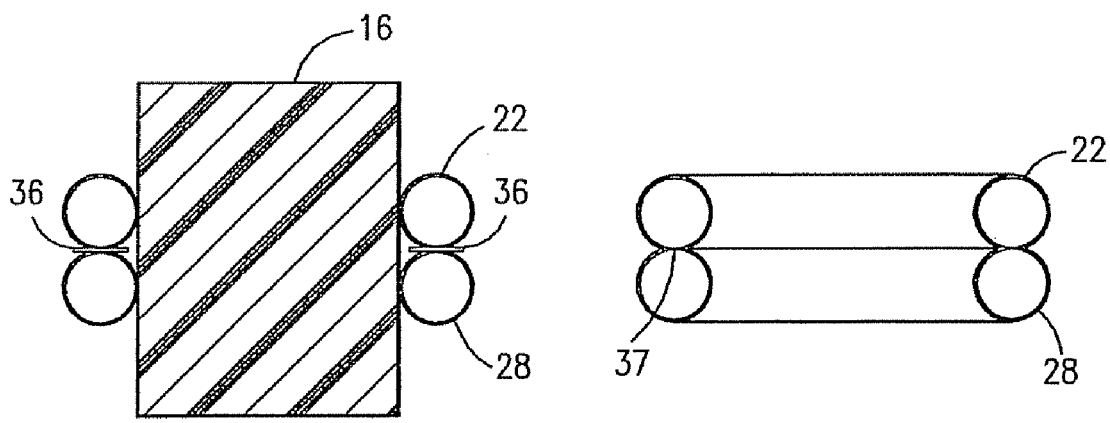
FIG. 8 is a cross sectional view of the cylindrical ring and the optical fibers shown in FIG. 1, illustrating a meniscus disposed between the fibers.
FIG. 9 is a view similar to FIG. 8 depicting the fibers fused together without the rod.

With further reference to FIGS. 8 and 9, it is contemplated that a small amount of a fluid, preferably water, oil or a polymer, may be interposed between the loops 22 and 28 to form a meniscus 36 and thus increase the modal overlap between the two, as discussed below. It is also contemplated that the fluid may be applied as a liquid and subsequently cured to form a solid. In the embodiment illustrated in FIG. 9, the loops 22 and 28 may be fused to one another at one or more locations, as schematically shown at 37. Where the loops 22 and 28 are fixed relative to one another, it is contemplated that the rod 16 may be eliminated and no meniscus 36 would be employed.

Referring now to FIGS. 2, 3, 6 and 7, the operation of the filter 10 is schematically depicted. A dense wavelength division multiplexed signal 38 is shown by the arrows in such Figs., which, for purposes of discussion, is assumed to include the optical wavelengths or optical channels λ1, λ2 and λ3. The signal 38 propagates through the first optical fiber 12 where it is confined within the boundaries of such fiber 12 until reaching the tapered portion 18. Because of the reduction in diameter of the optical fiber 12 at that location, a fraction of the optical energy of the signal 38 escapes the interior of the optical fiber 12 and travels along its boundary forming an evanescent field, as represented by the number 40 in FIGS. 2 and 3. The external environment at the boundary of the tapered portion 18 of first optical fiber 12 is chosen to determine the number of modes supported by the taper waist, i.e. the diameter of the tapered portion 18. Upon reaching the resonator 34, the optical energy of the signal 38 within the evanescent field 40 created along the first optical fiber 12 couples to the second loop 28 of the second optical fiber 14, i.e. a fraction of the optical energy from the first optical fiber 12 is transferred to the second optical fiber 14 in the area of their respective loops 22 and 28. These loops 22 and 28 provide a recirculating path for the optical energy around rod 16, thus forming the resonator 34 with resonance frequencies spaced by the free spectral range according to the following relationship:

$$F = \frac{c}{n_{eff} L} \tag{1}$$

Where:
F=Free spectral range
c=speed of light
$n_{eff}$=effective index of the fundamental mode of the taper waist
L=circumference of the resonator The taper waist of the optical fiber 12 is not single mode in air, but the bend radius of the loops 22 and 28 is large enough and the modal dispersion sufficiently large that coupling to higher order modes does not occur within the resonator 34. Additionally, at least a portion of the rod 16 has an index of refraction which is below that of the optical fibers 12 and 14 to suppress coupling between the optical power circulating within the resonator 34 and the rod 16. In particular, at least that portion of the surface of the rod 16 which is exposed to the evanescent field, including the depth of penetration of such field into the rod 16, need have an index of refraction below that of the optical fibers 12 and 14.

Figure 6:
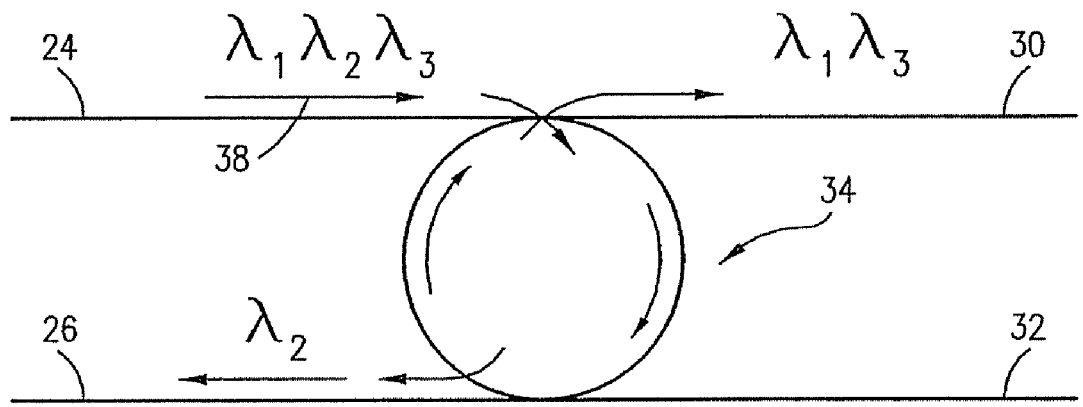
FIG. 6 is a schematic representation of a drop or de-interleaver function of the filter of this invention.

As noted above, the filter 10 of this invention is a four-port filter including an input port 24 and drop port 26 formed by the first optical fiber 12, and a thru port 30 and add port 32 formed by the second optical fiber 14. FIG. 6 is a schematic depiction of the filter 10 performing a drop or de-interleaver function in which one of the optical channels, λ2, is to be removed from the remainder of the signal 38. A fraction of the optical energy of the signal 38 is transmitted to the resonator 34 formed by the loops 22 and 28 by evanescent field coupling, as discussed above. The resonator 34 has one resonance frequency, among potentially a number of resonance frequencies, corresponding to the optical channel λ2 of interest. The optical channel λ2 is therefore transmitted to the drop port 26 of the first optical fiber 12 by the resonator 34 while the other optical channels λ1 and λ3 are allowed to pass through the resonator 34 into the thru port 30 of the second optical fiber 14.

Figure 7:
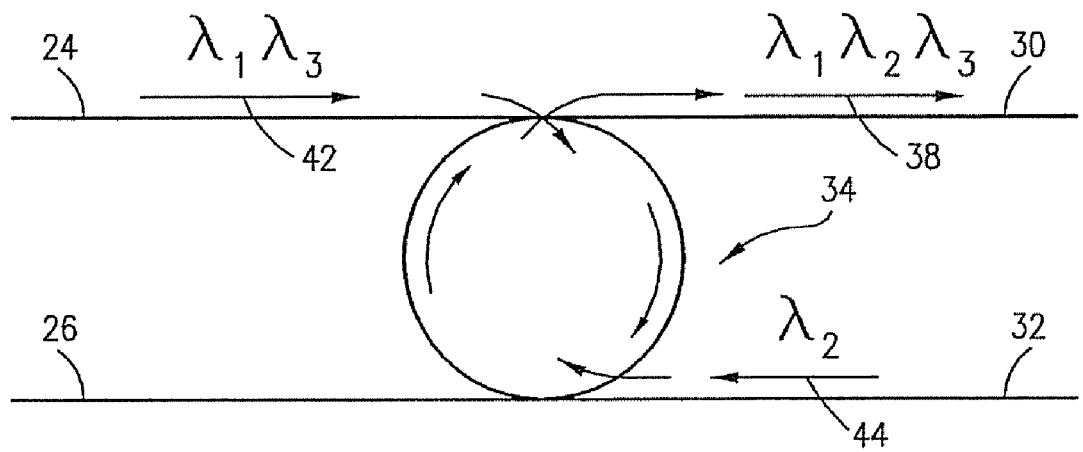
FIG. 7 is a view similar to FIG. 6, except of an add or interleaver function of the filter herein.

The "add" function of the filter 10 is shown in FIG. 7. In this mode of operation, it is assumed that a signal 42 is input through the input port 24 of the first optical fiber having optical channels λ1 and λ3, and it is desired to add or interleave a third optical channel λ2. The signal 42 is coupled to the resonator 34 in the same manner discussed above. Another signal 44 carrying the optical channel λ2 is input to the resonator 34 through the add port 32 of the second optical fiber 14, also by evanescent field coupling, as denoted by the number 41 in FIGS. 2 and 3. The signals 42 and 44 are added or interleaved within the resonator 34 which then outputs a signal 38 having all three optical channels λ1, λ2 and λ3. It should be understood that the depictions shown in FIGS. 6 and 7 are for purposes of illustration only, and the various dense wavelength division multiplexed signals may contain many more optical channels, as desired.

Referring now to FIGS. 2, 3, 10 and 11, the transmission coefficient from the input port 24 of first optical fiber 12 to the thru port 30 of the second optical fiber 14, represented by $\tau_1$, is considered equal to the coupling coefficient between the contact point of the loops 22 and 28, identified by the number 46. Likewise, coupling occurs between the loops 22 and 28 on the opposite side of the rod 16, as at 48, designated by coupling coefficient $\tau_2$ in FIGS. 2 and 3. The strength of the coupling is determined by the overlap of the mode fields in each tapered portion 18, 20 of respective optical fibers 12 and 14, and the length of the interaction region, e.g. the length of the overlapping portions of the loops 22 and 28. Factors influencing the magnitude of the coupling coefficient include the diameter of the tapered portions 18, 20, the radius of the rod 16 and the index of refraction of the surroundings. Coupling can be enhanced by the introduction of a meniscus 36 between the loops 22 and 28, as described above, and shown in FIG. 8, which increases the modal overlap.

The transmission of the filter 10 from the input port 24 to the through port 30 is given by the following relationship:

$$T_{thru} = \frac{\tau_1^2 e^{aL} + \tau_2^2 e^{-aL} - 2\tau_1\tau_2\cos(2\pi n_{eff}L/\lambda)}{e^{aL} + \tau_1^2\tau_2^2 e^{-aL} - 2\tau_1\tau_2\cos(2\pi n_{eff}L/\lambda)}, \quad (2)$$

The transmission of the filter from the input port 24 to the drop port 26 is given by the following relationship:

$$T_{drop} = \frac{(1-\tau_1^2)(1-\tau_2^2)}{e^{aL} + \tau_1^2\tau_2^2 e^{-aL} - 2\tau_1\tau_2\cos(2\pi n_{eff}L/\lambda)}, \quad (3)$$

Figure 10:
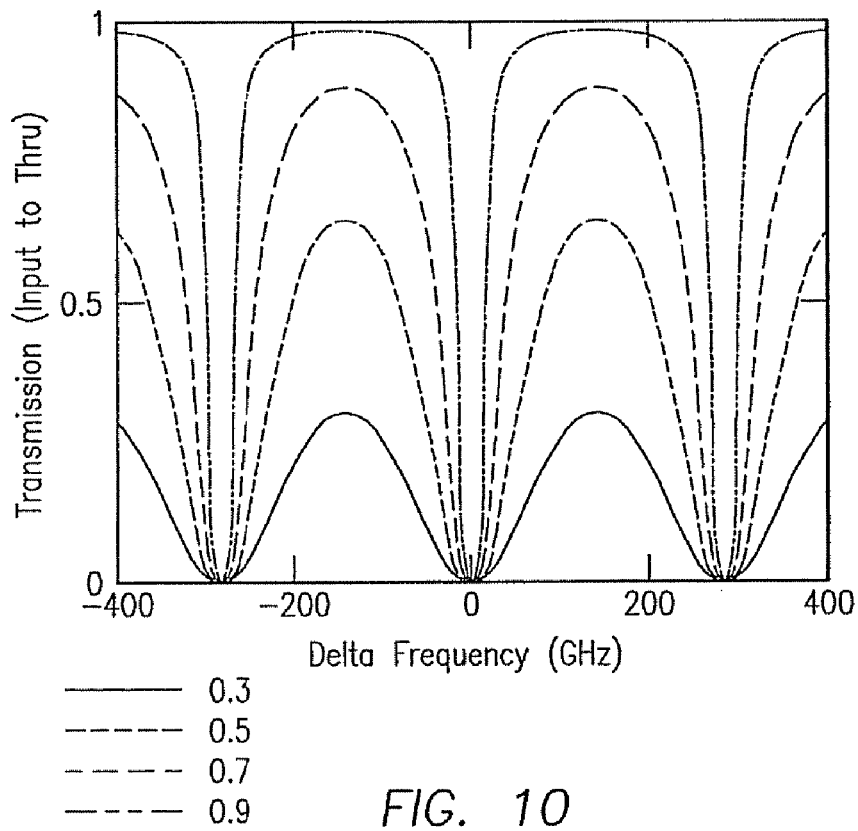
FIG. 10 is a graphical depiction of the transmission of optical power from the input port of the filter to its through port for several coupling coefficients.
Figure 11:
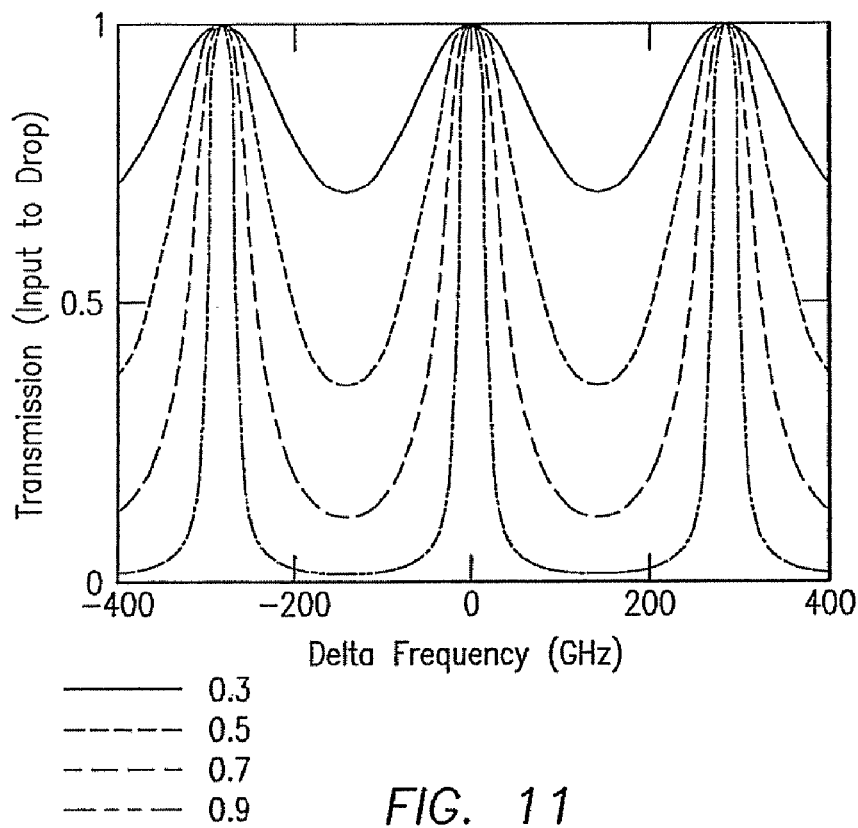
FIG. 11 is a graphical depiction of the transmission of optical power from the input port of the filter to its drop port for several coupling coefficients.

Where:

$\tau_1$=transmission coefficient from input port to thru port $\tau_2$=transmission coefficient from input port to drop port $e^{-aL}$=round trip transmission of the resonator accounting for propagation losses and excess loss in the coupling regions L=circumference of the resonator $n_{eff}$=effective index of the fundamental mode of the taper waist λ=wavelength FIGS. 10 and 11 are graphical depictions of a plot of transmission versus frequency for a broad range of coupling coefficient values, e.g. 0.3 to 0.9, neglecting round trip loss (α=0). The transmission from the input port 24 to the thru port 30 is shown in FIG. 10, and the transmission from the input port 24 to the drop port 26 is shown in FIG. 11. The diameter of the resonator 34 modeled in FIGS. 10 and 11 is 230 um. As is evident from such Figs., a coupling coefficient of near unity is required to achieve narrow band filter features.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An optical device, comprising:
   a first optical fiber having a first end, a second end and a tapered portion located between said first and second ends, said tapered portion being formed in a substantially 180° first loop so that said first and second ends are oriented generally parallel to one another;
   a second optical fiber having a first end, a second end and a tapered portion located between said first and second ends, said tapered portion being formed in a substantially 180° second loop so that said first and second ends are oriented generally parallel to one another;
   said first loop and said second loop being positioned relative to one another to collectively form a ring resonator,
   optical power propagating within one of said first and second optical fibers being input to said ring resonator by evanescent field coupling, said optical power completing a circuit within said ring resonator by transitioning between said first loop and said second loop at two points of coupling.

2. The optical device of claim 1 further including a cylindrical rod, at least a portion of said cylindrical rod having an index of refraction less than the index of refraction of each of said first and second optical fibers.

3. The optical device of claim 2 in which said tapered portion of said first optical fiber is folded back on itself around said cylindrical rod to form said first loop.

4. The optical device of claim 2 in which said tapered portion of said second optical fiber is folded back on itself around said cylindrical rod to form said second loop.

5. The optical device of claim 4 in which said tapered portion of each of said first and second optical fibers is held in tension against said cylindrical rod.

6. The optical device of claim 2 in which said tapered portion of said first optical fiber is annealed to form said first loop, said first loop being positioned about said cylindrical rod.

7. The optical device of claim 2 in which said tapered portion of said second optical fiber is annealed to form said second loop, said second loop being positioned about of said cylindrical rod.

8. The optical device of claim 1 in which said first and second loops are fused together.

9. An optical device, comprising:
   a first optical fiber having tapered portion forming a first loop;
   a second optical fiber having a tapered portion forming a second loop;
   said first loop and said second loop being positioned relative to one another to collectively form a resonator, a meniscus being located between said first and second loops, whereby optical power propagating within one of said first and second optical fibers is input to said resonator by evanescent field coupling.

10. The optical device of claim 9 in which said meniscus is formed by a fluid.

11. The optical device of claim 9 in which said meniscus is formed by a liquid which is subsequently cured to form a solid.

12. An optical device, comprising:
a first optical fiber having a first end, a second end and a tapered portion located between said first and second ends, said tapered portion being formed in a substantially 180° first loop so that said first and second ends are oriented generally parallel to one another;
a second optical fiber having a first end, a second end and a tapered portion located between said first and second ends, said tapered portion being formed in a substantially 180° second loop so that said first and second ends are oriented generally parallel to one another;
said first loop and said second loop being fused together and positioned relative to one another to collectively form a ring resonator,
optical power propagating within one of said first and second optical fibers being input to said ring resonator by evanescent field coupling, said optical power completing a circuit within said ring resonator by transitioning between said first loop and said second loop at two points of coupling.

13. The optical device of claim 12 in which said tapered portion of each of said first and second loops is annealed.

* * * * *